UNITED STATES PATENT OFFICE.

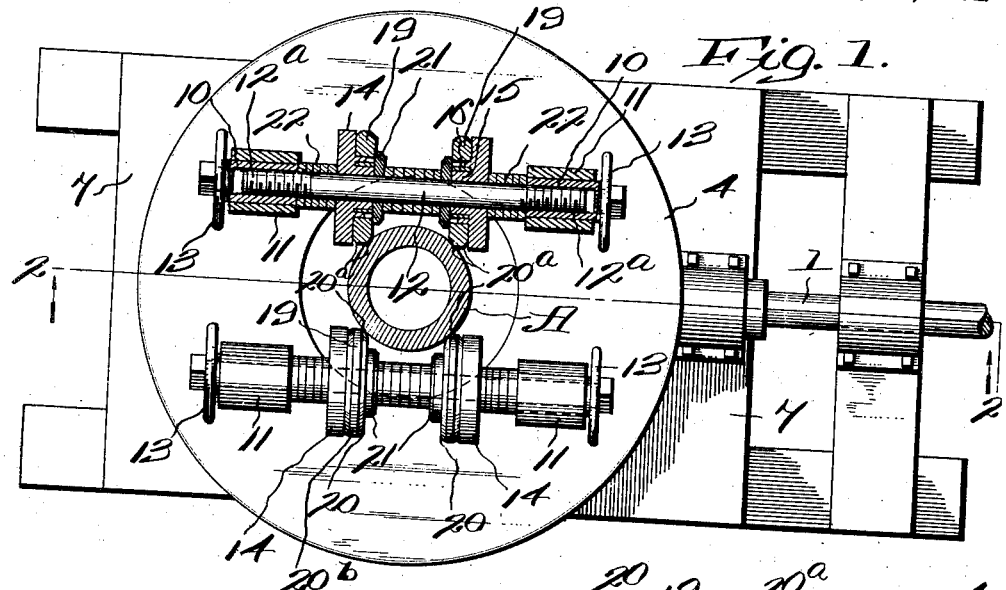

HARRY C. BREWSTER, OF SHREVEPORT, LOUISIANA.

TUBE-GRIPPING APPARATUS FOR BORING WELLS.

1,107,025.  Specification of Letters Patent.  Patented Aug. 11, 1914.

Application filed September 30, 1913. Serial No. 792,684.

*To all whom it may concern:*

Be it known that I, HARRY C. BREWSTER, a citizen of the United States, residing at Shreveport, in the parish of Caddo and State of Louisiana, have invented certain new and useful Improvements in Tube-Gripping Apparatus for Boring Wells; and I do hereby declare the following to be a full, clear, and exact description of the invention, such as will enable others skilled in the art to which it appertains to make and use the same.

My present invention relates to improvements in tube gripping apparatus for use in boring wells, and is more especially intended to apply to apparatus for boring oil or Artesian wells.

The invention especially relates to the improved gripping rings adapted to engage the tube and rotate the same while it is being driven down in the well, and at the same time to permit the tube to move axially downward whereby the cutting tools carried by the lower end of the tube may be both driven in a rotary direction and may be also given a downward movement in boring the well.

My invention will be understood by reference to the accompanying drawing, in which:—

Figure 1 is a plan view, partly in section, of the apparatus; Fig. 2 shows a section along the line 2—2 of Fig. 1, and looking in the direction of the arrows; and Fig. 3 is a perspective view showing one of the improved gripping rings and the mode of assembling the same on its spindle.

Like symbols of reference indicate corresponding parts throughout the several views.

Referring to the drawings, the operating shaft 1 is driven by any suitable source of power, and carries a bevel gear 2 meshing in the teeth 3 of the circular revolving table 4 mounted above the fixed table 6, and separated therefrom by any suitable anti-friction devices, such as the cone bearings 5. The fixed table 6 is mounted on the framework 7 of the machine, and is provided with a central aperture into which projects the cylindrical portion 8 of the rotary table 4, and a set collar 9 is screwed on this portion 8 to lock the rotary table against accidental displacement. The rotary table 4 has attached to or integral therewith four sockets 11, in which are mounted the sleeves 10 internally screw-threaded to engage the screw threads $12^a$ on the ends of the mandrel 12, as shown most clearly in Fig. 1. These sleeves or nuts 10 are rotated by the hand wheels 13.

Slidably mounted on the mandrel 12 are the backing rings 14, each provided with a boss 15 and studs 16, which boss projects into the central cavity 17, and which studs project into the perforations 18 in the gripping rings 19. These gripping rings are preferably made with the two beveled faces 20 and with the cutting edges $20^a$ at each side of the cylindrical portion $20^b$, and the two sides of the two gripping rings being symmetrical, these rings may be reversed on the mandrel 12 when desired. On the inner face of each gripping ring I provide a washer ring 21 projecting beyond the edges of the opening 17 in the gripping ring, and between these rings 21, and wherever desired on the mandrel 12, suitable washers 22 are provided, and the parts may be approximately placed to grip the tube A, while the final adjustment is effected by means of the hand wheels 13 and the nuts 10 and screw threads $12^a$.

In operation it will be noted that as the table 4 rotates the gripping rings will firmly engage the tube A and will rotate the same, while the gripping rings, being free to rotate on the mandrel 12, will permit the vertical movement of the tube A.

In making the device, the backing rings 14 may be made of any suitable material, such as cast steel, and the studs 16 may be inserted therein, and forged steel may be used for these studs. The gripping ring 20 should preferably be made of tool steel and being reversible as shown will wear a long time, and may be reversed whenever desired, and also when much worn it may be taken off and turned down and used indefinitely. By having thin tool steel gripping rings suitably braced by the heavy backing rings 14, the wearing parts of the gripping device can be more readily manufactured without cracking, and are not as likely to split or crack when in use as the larger castings now commonly in use for this purpose. Moreover, by having gripping rings of this construction, and properly braced from the rear, cheaper rings may be used, which may be reversed when desired, or turned down and rendered good as new, while the heavier cast backing rings may be used indefinitely.

Having thus described my invention what I claim and desire to secure by Letters Patent of the United States is:—

1. In an apparatus of the character described, the combination with a mandrel of a solid backing ring slidably mounted thereon, and a gripping ring also mounted on said mandrel and connected to said backing ring, substantially as described.

2. In an apparatus of the character described, the combination with a mandrel of a solid backing ring slidably mounted thereon, a detachable gripping ring provided with beveled cutting edges also mounted on said mandrel, and means for securing said gripping ring to said backing ring, substantially as described.

3. In an apparatus of the character described, the combination with a mandrel of a solid backing ring slidably mounted thereon, and a reversible gripping ring also mounted on said mandrel and connected to said backing ring, substantially as described.

4. In an apparatus of the character described, the combination with a mandrel of a solid backing ring slidably mounted thereon, a detachable reversible backing ring provided with beveled cutting edges also mounted on said mandrel, and means for securing said gripping ring to said backing ring, substantially as described.

5. In an apparatus of the character described, the combination with a mandrel of a solid backing ring slidably mounted thereon and provided with a central boss and engaging pins, and a gripping ring also mounted on said mandrel and adapted to slip over said central boss and to engage said lugs on said backing ring, substantially as described.

6. In an apparatus of the character described, the combination with a mandrel of a solid backing ring slidably mounted thereon, and provided with a central boss and engaging pins, and a detachable gripping ring provided with beveled cutting edges also mounted on said mandrel, and perforated to receive said boss and said lugs for securing said gripping ring to said backing ring, substantially as described.

7. In an apparatus of the character described, the combination with a mandrel of a solid backing ring slidably mounted thereon, and provided with a central boss and engaging pins, and a reversible gripping ring also mounted on said mandrel and adapted to slip over said central boss and to engage said lugs on said backing ring, substantially as described.

8. In an apparatus of the character described, the combination with a mandrel of a solid backing ring slidably mounted thereon, and provided with a central boss and engaging pins, and a detachable reversible backing ring provided with beveled cutting edges also mounted on said mandrel, and perforated to receive said boss and said lugs for securing said gripping ring to said backing ring, substantially as described.

In testimony whereof, I affix my signature, in presence of two witnesses.

HARRY C. BREWSTER.

Witnesses:
C. B. TURNER,
A. BATEMAN.